United States Patent
Ahn et al.

(10) Patent No.: US 12,145,106 B2
(45) Date of Patent: Nov. 19, 2024

(54) HUMIDIFIER FOR FUEL CELL

(71) Applicant: KOLON INDUSTRIES, INC., Seoul (KR)

(72) Inventors: Woong Jeon Ahn, Seoul (KR); Young Seok Oh, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 515 days.

(21) Appl. No.: 17/762,364

(22) PCT Filed: Nov. 27, 2020

(86) PCT No.: PCT/KR2020/017045
§ 371 (c)(1),
(2) Date: Mar. 21, 2022

(87) PCT Pub. No.: WO2021/107668
PCT Pub. Date: Jun. 3, 2021

(65) Prior Publication Data
US 2022/0393199 A1    Dec. 8, 2022

(30) Foreign Application Priority Data

Nov. 29, 2019    (KR) .................. 10-2019-0156900

(51) Int. Cl.
*H01M 8/04* (2016.01)
*B01D 63/02* (2006.01)
*H01M 8/04119* (2016.01)

(52) U.S. Cl.
CPC ........ *B01D 63/02* (2013.01); *H01M 8/04141* (2013.01); *H01M 8/04149* (2013.01);
(Continued)

(58) Field of Classification Search
CPC . H01M 8/04; H01M 8/04141; H01M 8/04149
See application file for complete search history.

(56) References Cited

U.S. PATENT DOCUMENTS

2002/0039674 A1* 4/2002 Suzuki ............... H01M 8/04119
429/414
2009/0121366 A1* 5/2009 Leister .................. B01D 53/22
261/101

(Continued)

FOREIGN PATENT DOCUMENTS

| CN | 103000919 A | 3/2013 |
|---|---|---|
| CN | 103566675 A | 2/2014 |

(Continued)

OTHER PUBLICATIONS

The office action dated Dec. 21, 2023 related to the corresponding Chinese Patent application.

*Primary Examiner* — Kenneth J Douyette
(74) *Attorney, Agent, or Firm* — Harvest IP Law, LLP

(57) ABSTRACT

The present invention relates to a humidifier for a fuel cell, the humidifier comprising: a humidifying module for humidifying a dry gas, supplied from the outside, by using a wet gas discharged from a fuel cell stack; and a first cap coupled to one end of the humidifying module. The humidifying module includes: a mid-case; and at least one cartridge disposed in the mid-case and accommodating a plurality of hollow fiber membranes. The humidifier for a fuel cell further includes a first packing member which is air-tightly coupled to at least one end of the humidifying module through mechanical assembly so that the first cap is in fluid communication with only the hollow fiber membranes.

12 Claims, 13 Drawing Sheets

(52) U.S. Cl.
CPC ...... *B01D 2313/04* (2013.01); *B01D 2313/21* (2013.01); *B01D 2313/44* (2013.01)

(56) References Cited

U.S. PATENT DOCUMENTS

| | | |
|---|---|---|
| 2014/0291874 A1 | 10/2014 | Kim |
| 2016/0107125 A1 | 4/2016 | Kobayashi |
| 2017/0077531 A1 | 3/2017 | Kim |
| 2021/0057767 A1* | 2/2021 | Kim ................ B01D 63/024 |

FOREIGN PATENT DOCUMENTS

| | | | |
|---|---|---|---|
| CN | 106099142 | A | 11/2016 |
| KR | 20060127833 | A | 12/2006 |
| KR | 20130034404 | A | 4/2013 |
| KR | 20180001227 | A | 1/2018 |
| KR | 20190055635 | A | 5/2019 |
| KR | 20190081736 | A | 7/2019 |

\* cited by examiner

[FIG. 1]
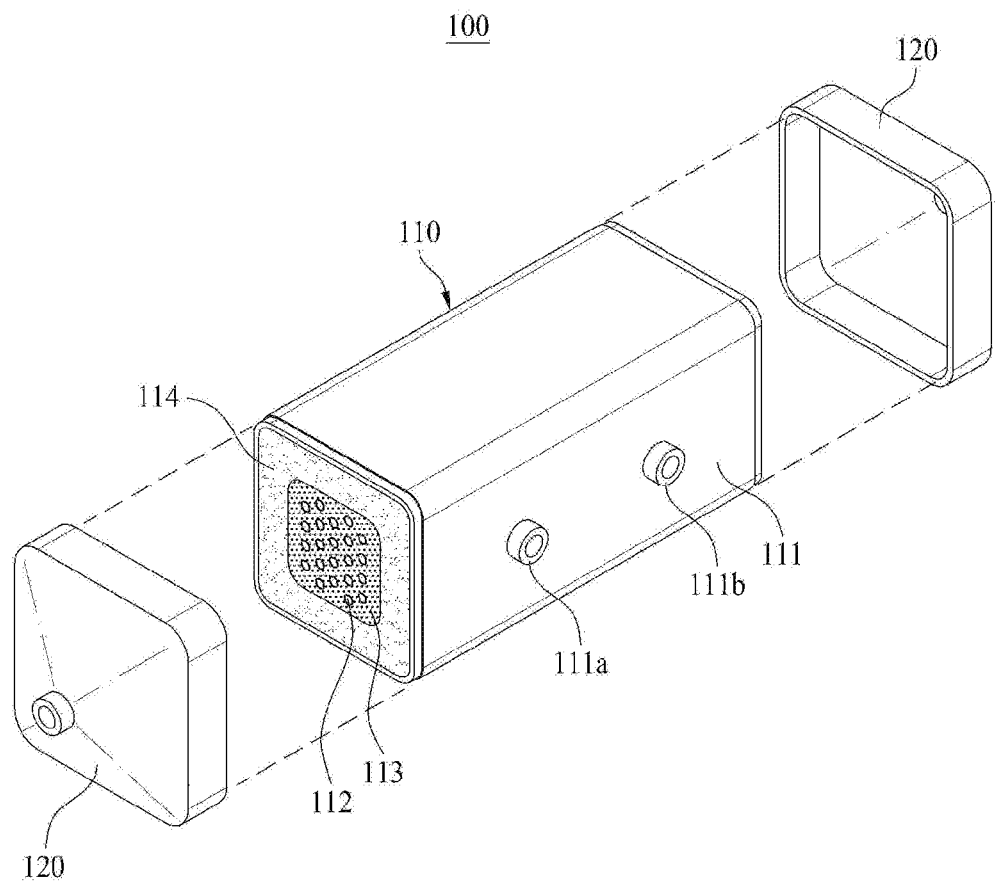

【FIG. 2】
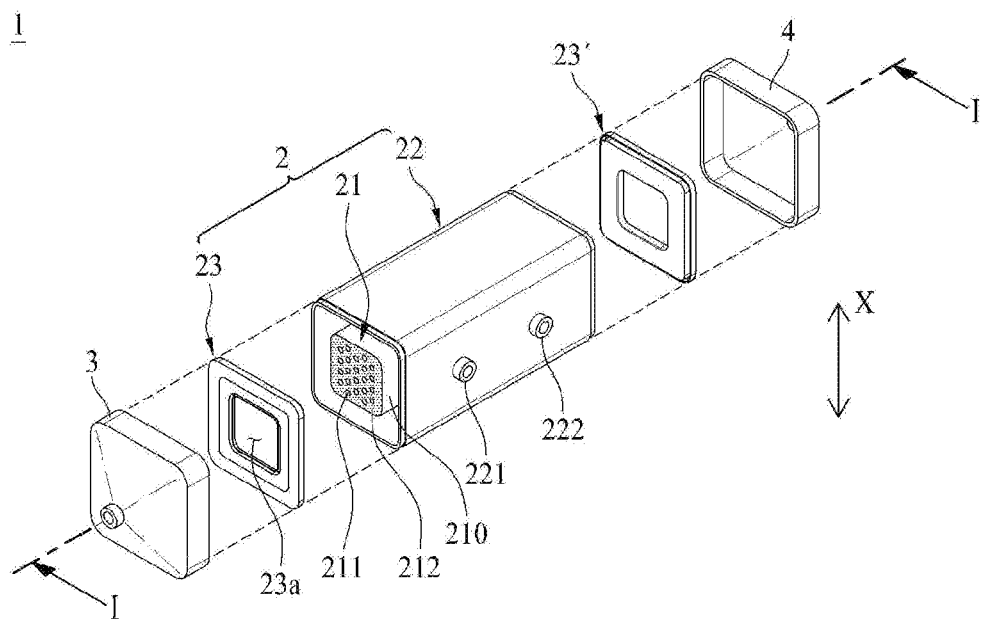
【FIG. 3】
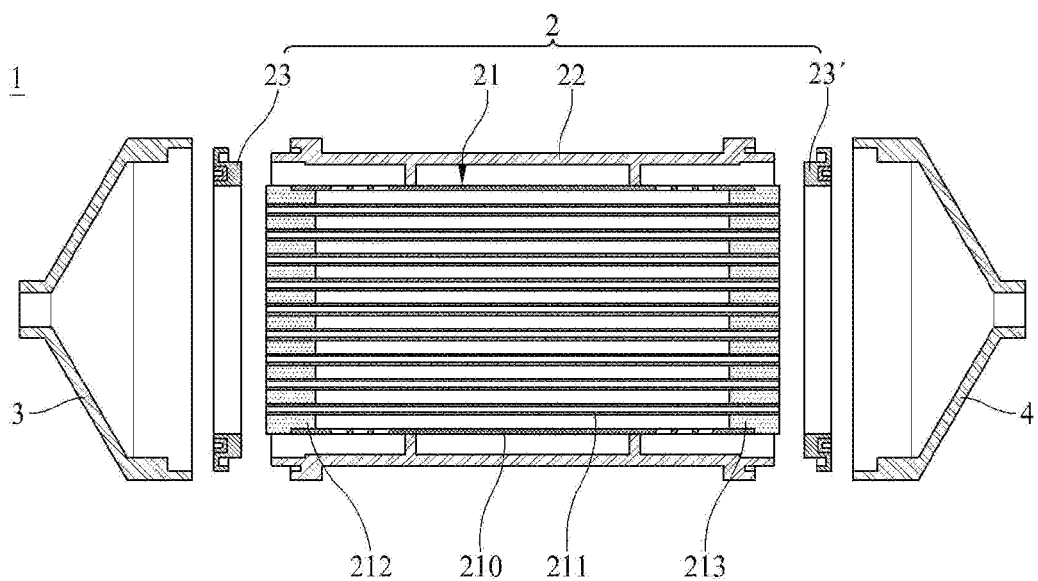

[FIG. 4]
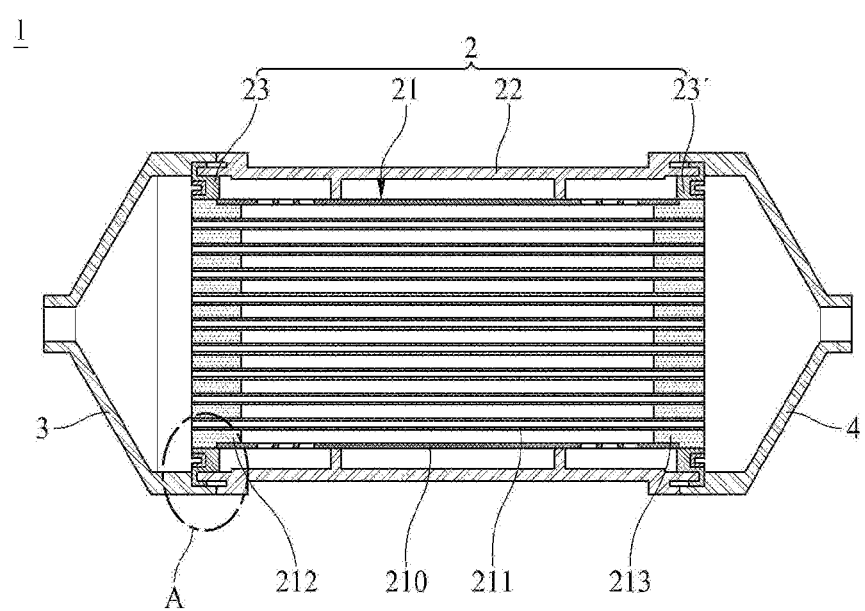

[FIG. 5]
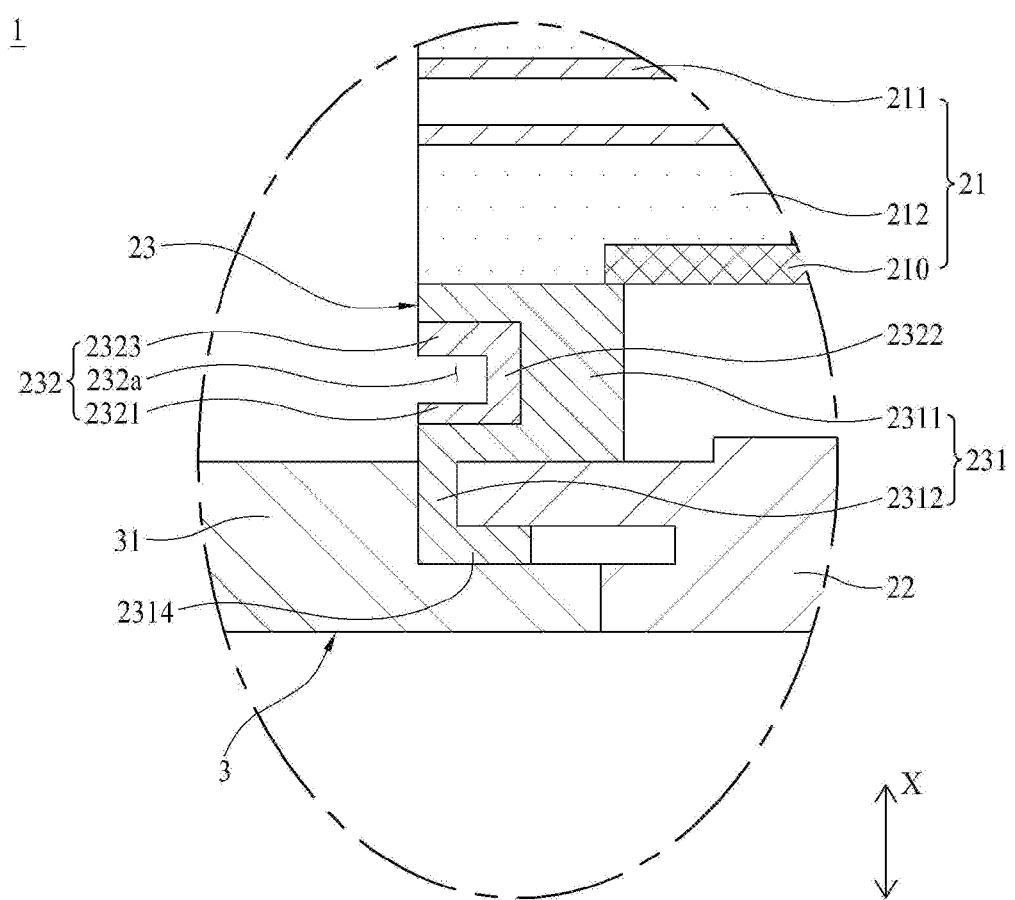

[FIG. 6]
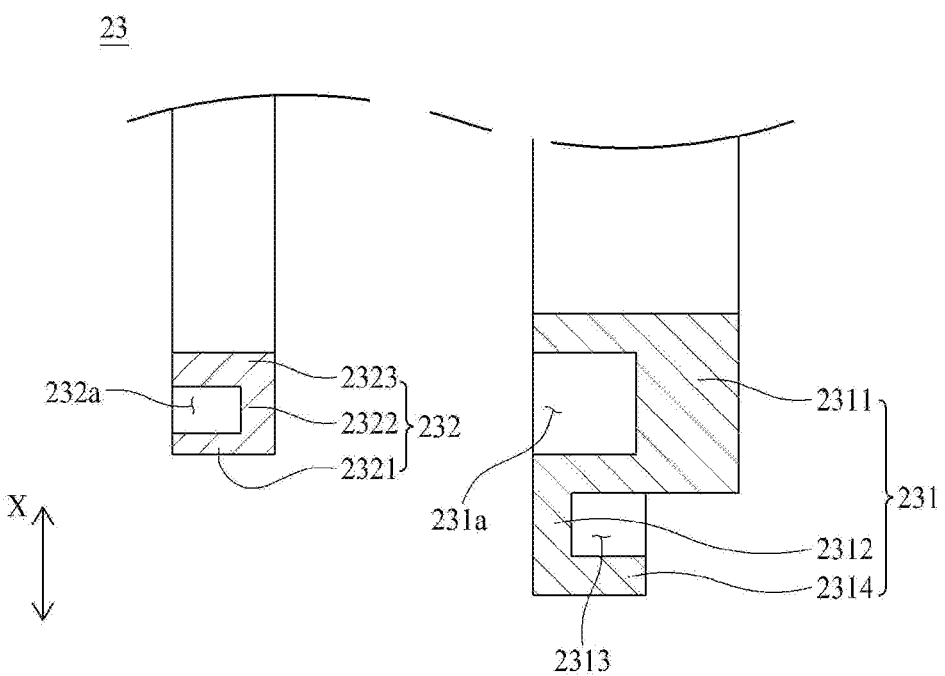

[FIG. 7]
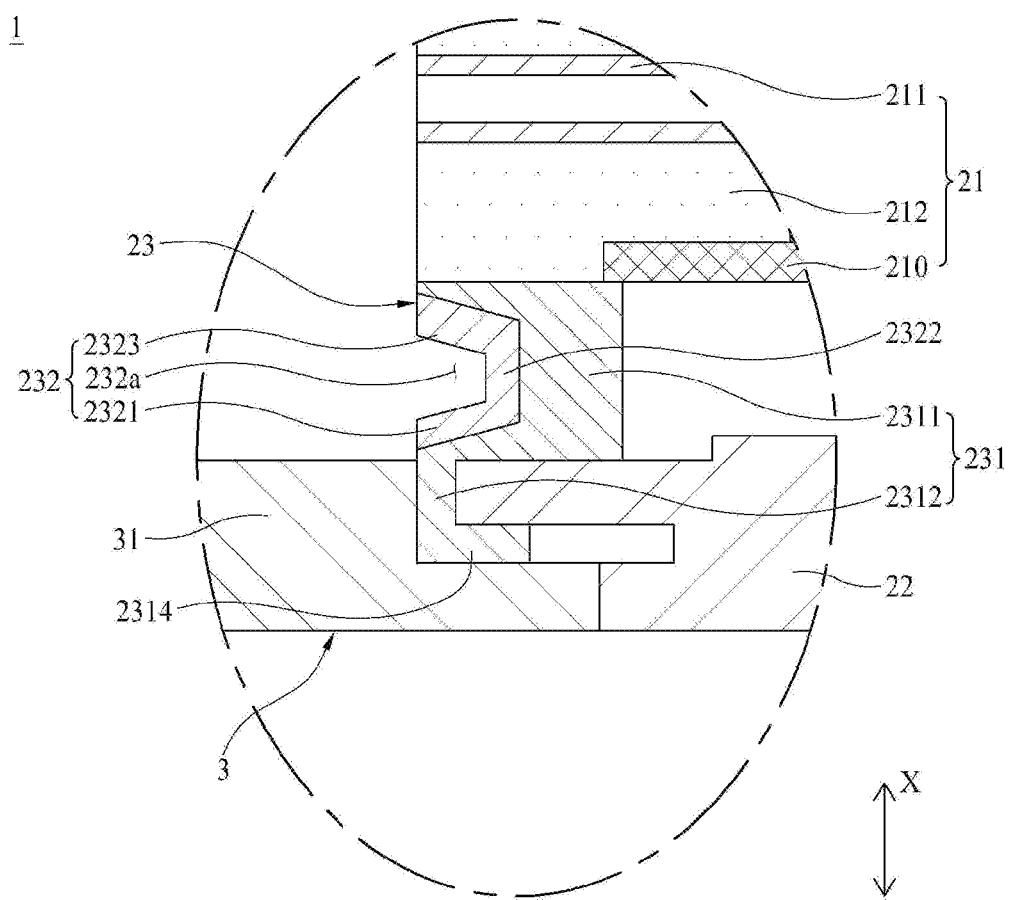

【FIG. 8】
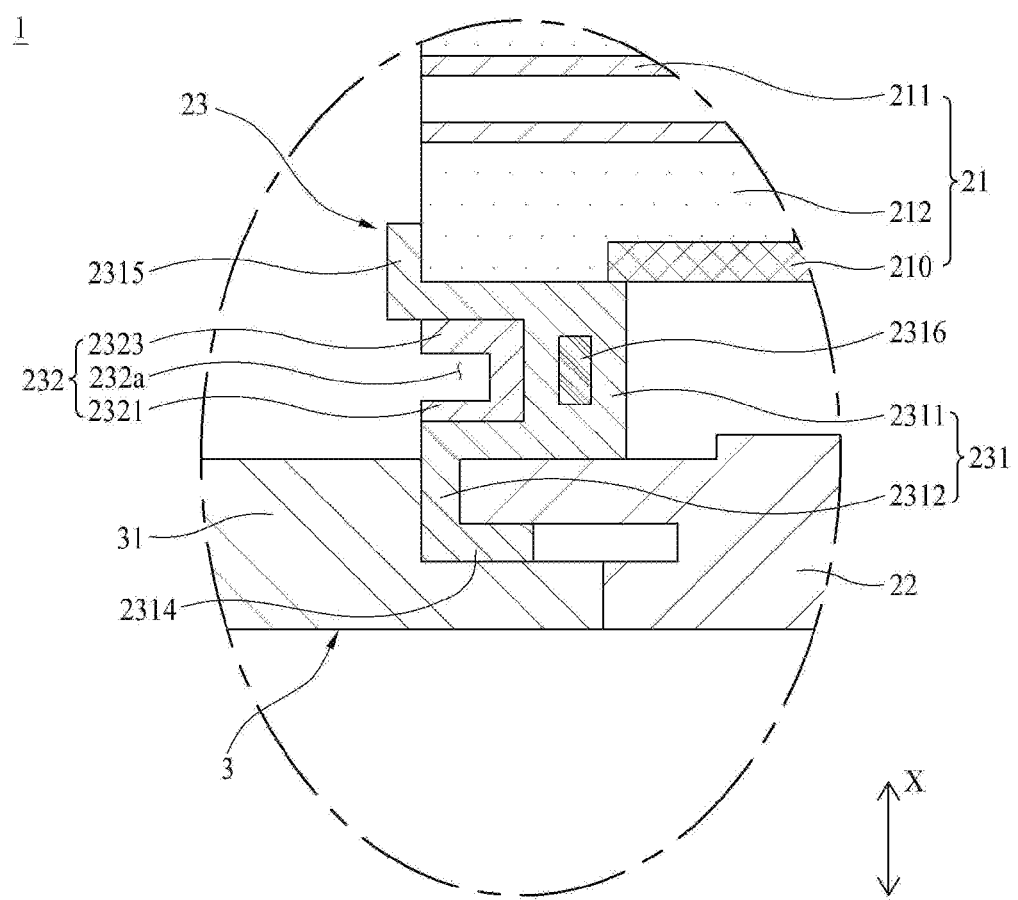

[FIG. 9]
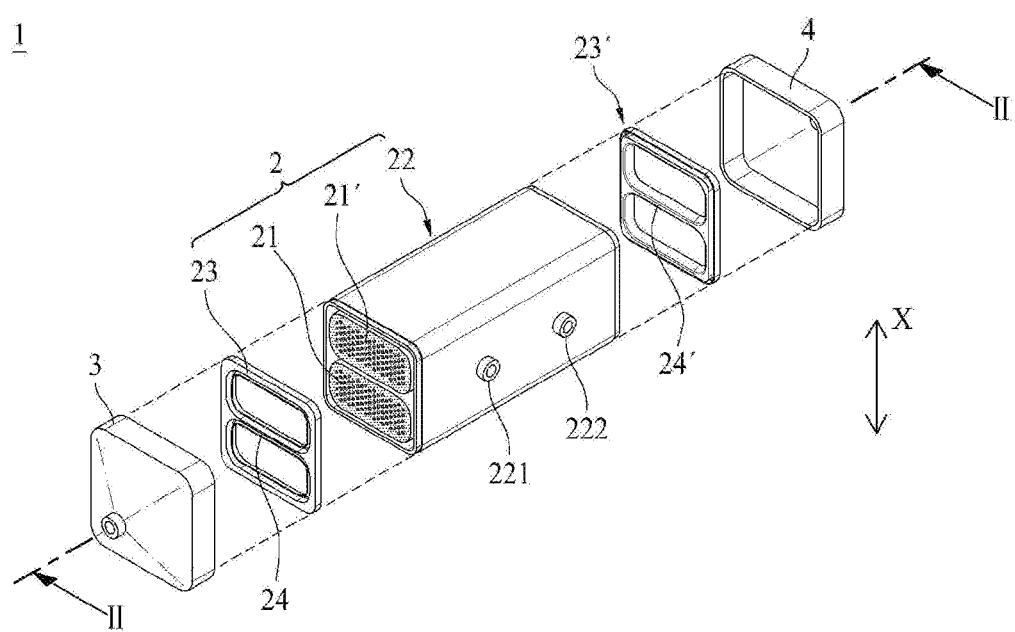

[FIG. 10]
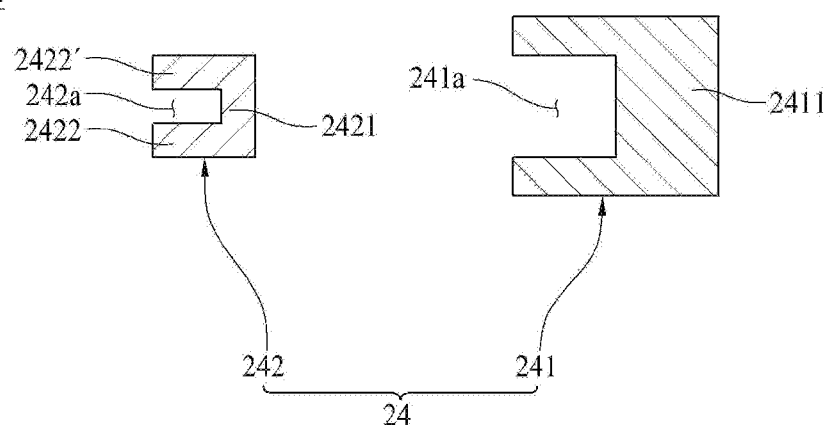
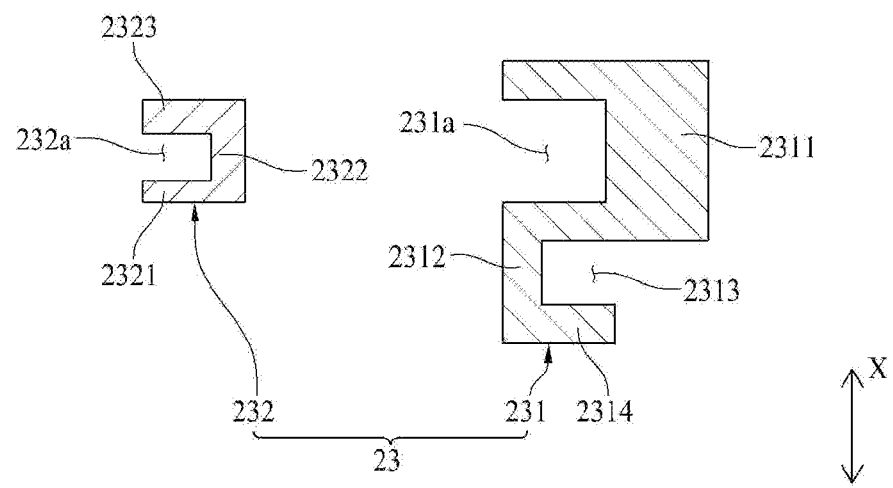

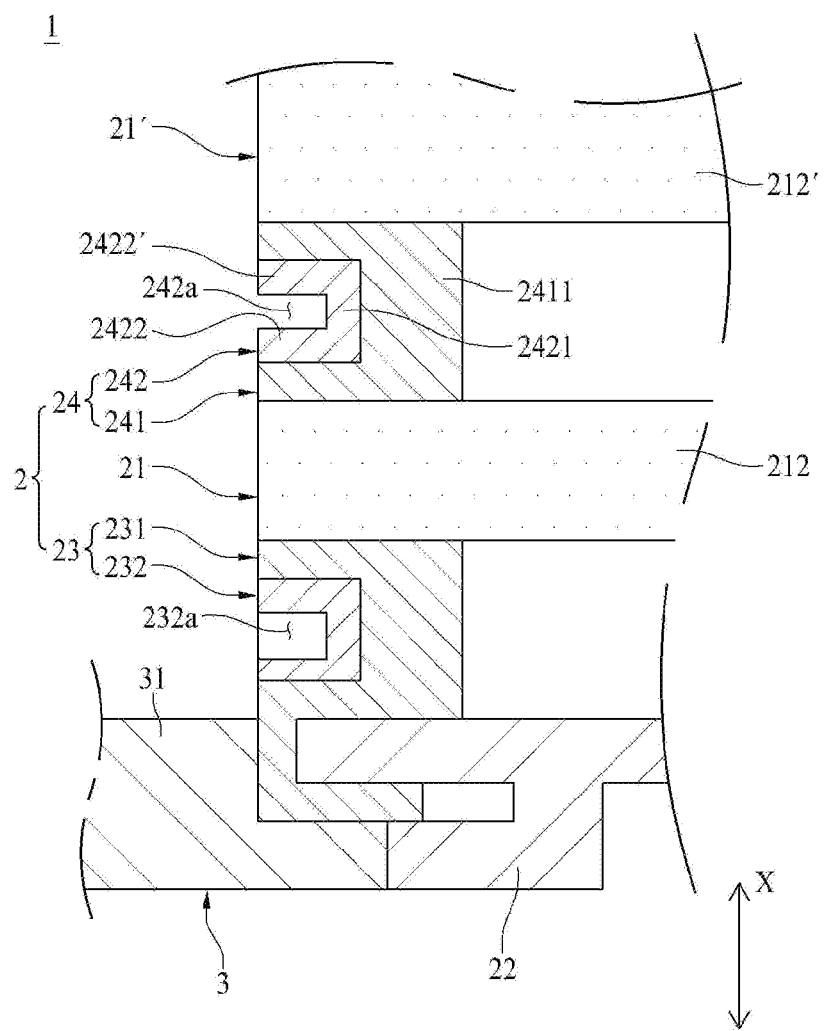
[FIG. 11]

[FIG. 12]
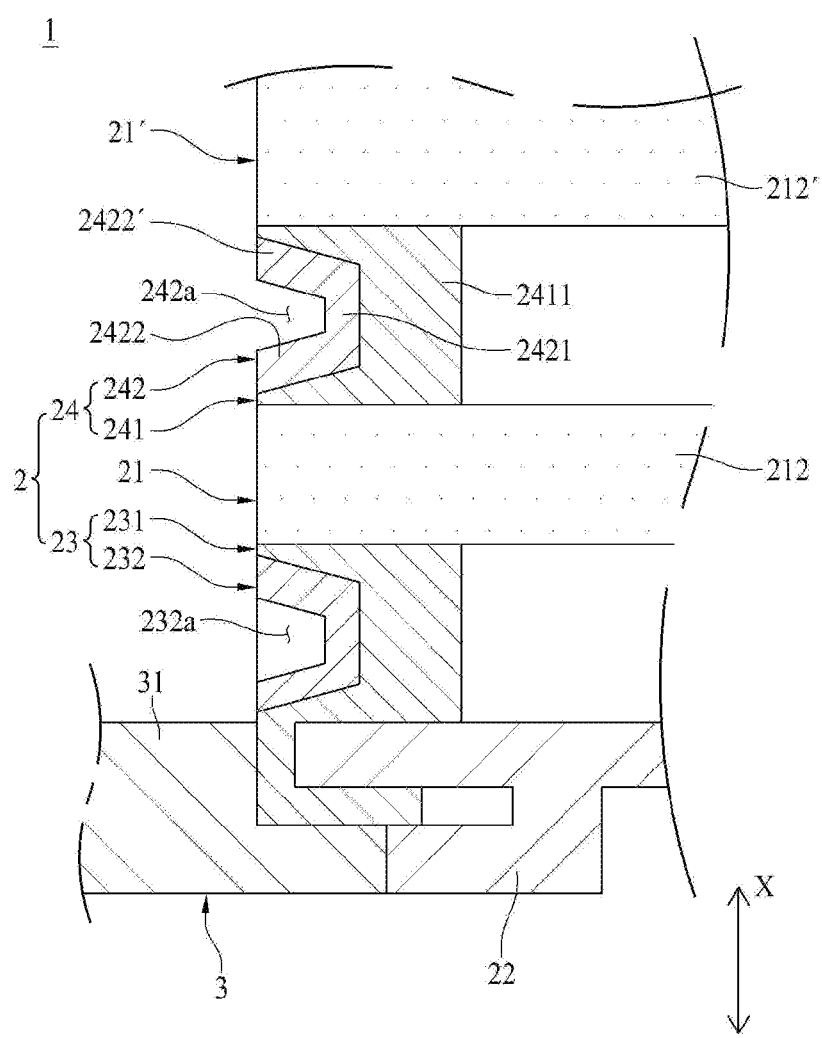

【FIG. 13】
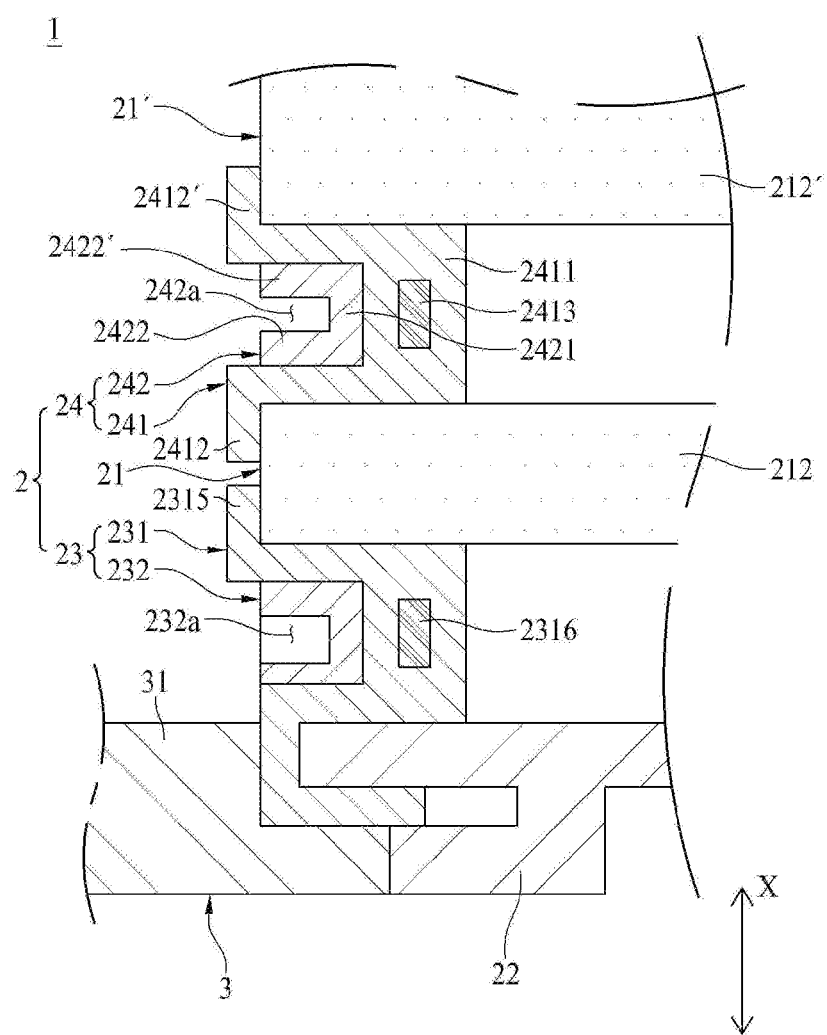

[FIG. 14]
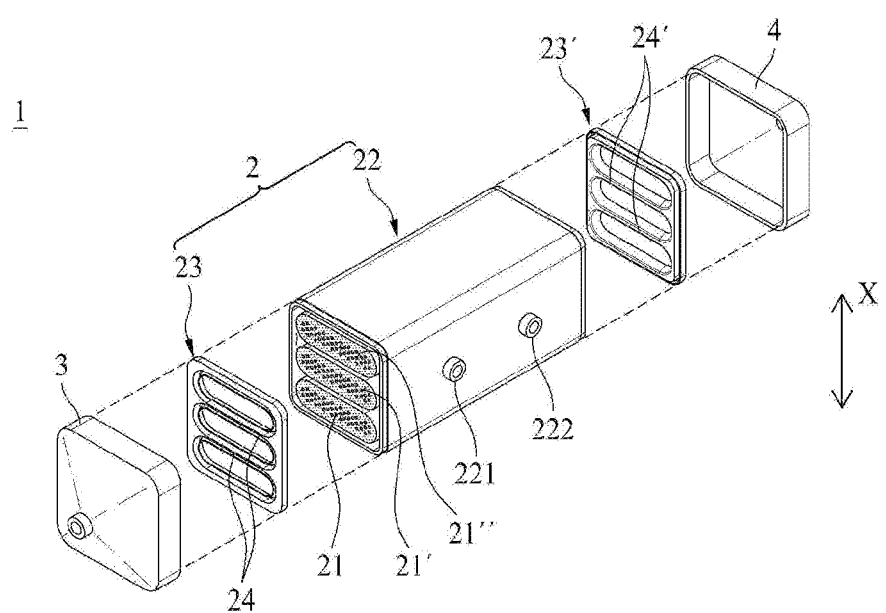

HUMIDIFIER FOR FUEL CELL

CROSS REFERENCE TO RELATED APPLICATIONS

This application is a National Stage of International Application No. PCT/KR2020/017045 filed Nov. 27, 2020, claiming priority to Korean Patent Application No. 10-2019-0156900 filed Nov. 29, 2019, the disclosures of which is incorporated herein by reference in its entirety.

TECHNICAL FIELD

The present disclosure relates to a humidifier for fuel cells configured to supply humidified gas to a fuel cell.

BACKGROUND ART

A fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to air that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the fuel cell even at a small capacity, it is possible to use a low-priced material, and it is possible to collect moisture and heat included in off-gas discharged from the fuel cell at a high temperature and to reuse the collected moisture and heat through the humidifier.

FIG. 1 is a schematic exploded perspective view of a conventional humidifier for fuel cells.

As illustrated in FIG. 1, a conventional membrane humidification type humidifier 100 includes a humidifying module 110, in which moisture exchange is performed between air supplied from the outside and off-gas discharged from a fuel cell stack (not shown), and caps 1200 coupled respectively to opposite ends of the humidifying module 110.

One of the caps 120 transmits air supplied from the outside to the humidifying module 110, and the other cap transmits air humidified by the humidifying module 110 to the fuel cell stack.

The humidifying module 110 includes a mid-case 111 having an off-gas inlet 111a and an off-gas outlet 111b and a plurality of hollow fiber membranes 112 in the mid-case 111. Opposite ends of a bundle of hollow fiber membranes 112 are potted in fixing layers 113. In general, each of the fixing layers 113 is formed by hardening a liquid polymer, such as liquid polyurethane resin, using a casting method.

Air supplied from the outside flows along hollow parts of the hollow fiber membranes 112. Off-gas introduced into the mid-case 111 through the off-gas inlet 111a comes into contact with the outer surfaces of the hollow fiber membranes 112, and is discharged from the mid-case 111 through the off-gas outlet 111b. When the off-gas comes into contact with the outer surfaces of the hollow fiber membranes 112, moisture contained in the off-gas is transmitted through the hollow fiber membranes 112 to humidify air flowing along the hollow parts of the hollow fiber membranes 112.

Inner spaces of the caps 120 must fluidly communicate with only the hollow parts of the hollow fiber membranes 112 in a state of being completely isolated from an inner space of the mid-case 111. If not, air leakage due to pressure difference occurs, whereby the amount of humidified air that is supplied to the fuel cell stack is reduced and power generation efficiency of a fuel cell is lowered.

In general, as illustrated in FIG. 1, the fixing layers 113, in which opposite ends of the hollow fiber membranes 112 are potted, and resin layers 114 provided between the fixing layers 113 and the mid-case 111 isolate the inner spaces of the caps 120 from the inner space of the mid-case 111. Similarly to the fixing layers 113, each of the resin layers 114 is generally formed by hardening a liquid polymer, such as liquid polyurethane resin, using a casting method.

However, a casting process for forming the resin layers 114 requires a relatively long process time, whereby productivity of the humidifier 100 is lowered.

DISCLOSURE

Technical Problem

The present disclosure has been made in view of the above problems, and it is an object of the present disclosure to provide a humidifier for fuel cells capable of preventing lowering in productivity of the humidifier due to formation of a resin layer through a casting process.

Technical Solution

In order to accomplish the above object, the present disclosure may include the following construction.

A humidifier for fuel cells according to the present disclosure may include a humidifying module configured to humidify dry gas supplied from outside using wet gas discharged from a fuel cell stack and a first cap coupled to one end of the humidifying module. The humidifying module may include a mid-case and at least one cartridge disposed in the mid-case, the cartridge being configured to receive a plurality of hollow fiber membranes. The humidifier for fuel cells according to the present disclosure may further include a first packing member airtightly coupled to at least one end of the humidifying module through mechanical assembly such that the first cap fluidly communicates with only the hollow fiber membranes. The first packing member may include a first soft member configured to contact each of the cartridge and the mid-case and a first hard member coupled to the first soft member. The first soft member may include a first insertion groove configured to allow the first hard member to be inserted thereinto. The first hard member may be deformed so as to extend in a separation direction in which the cartridge and the mid-case are separated from each other in a state of being inserted into the first insertion groove, whereby the first soft member may be brought into tight contact with the cartridge.

Advantageous Effects

The present disclosure is implemented such that a casting process for hermetically sealing an inner space of a cap and an inner space of a mid-case is omitted. In the present disclosure, therefore, it is possible to improve productivity through reduction in process time for production.

The present disclosure is implemented such that a packing member including a combination of a hard member and a soft member is provided, whereby the soft member is brought into tight contact with a cartridge through deformation of the hard member. In the present disclosure, therefore, it is possible to increase the force of hermetic sealing between the mid-case and the cartridge, whereby it is possible to improve humidification performance.

DESCRIPTION OF DRAWINGS

FIG. 1 is a schematic exploded perspective view of a conventional humidifier for fuel cells.

FIG. 2 is a schematic exploded perspective view of a humidifier for fuel cells according to the present disclosure.

FIG. 3 is a schematic exploded sectional view showing the humidifier for fuel cells according to the present disclosure, taken along line I-I of FIG. 2.

FIG. 4 is a schematic coupled sectional view showing the humidifier for fuel cells according to the present disclosure, taken along line I-I of FIG. 2.

FIG. 5 is a schematic enlarged sectional view showing part A of FIG. 4.

FIG. 6 is a schematic enlarged sectional view showing the state in which a first packing member is exploded, taken along line I-I of FIG. 2.

FIG. 7 is a schematic sectional view showing the state in which a first hard member is extended based on FIG. 5.

FIG. 8 is a schematic sectional view showing the state in which a first soft member is provided with a first supporting member based on FIG. 5.

FIG. 9 is a schematic exploded perspective view showing an embodiment in which two cartridges are coupled to a mid-case in the humidifier for fuel cells according to the present disclosure.

FIG. 10 is an enlarged conceptual view showing the state in which the first packing member and a second packing member are exploded, taken along line II-II of FIG. 9.

FIG. 11 is a schematic enlarged sectional view showing the state in which the first packing member and the second packing member are coupled to the mid-case and the cartridges, taken along line II-II of FIG. 9.

FIG. 12 is a schematic sectional view showing the state in which a second hard member is extended based on FIG. 11.

FIG. 13 is a schematic sectional view showing the state in which a second soft member is provided with second supporting members based on FIG. 11.

FIG. 14 is a schematic exploded perspective view showing an embodiment in which three cartridges are coupled to the mid-case in the humidifier for fuel cells according to the present disclosure.

BEST MODE

Hereinafter, embodiments of a humidifier for fuel cells according to the present disclosure will be described in detail with reference to the accompanying drawings.

Referring to FIGS. 2 to 4, a humidifier 1 for fuel cells according to the present disclosure humidifies dry gas supplied from the outside using wet gas discharged from a fuel cell stack (not shown). The dry gas may be fuel gas or air. After being humidified by the wet gas, the dry gas may be supplied to the fuel cell stack.

The humidifier 1 for fuel cells according to the present disclosure includes a humidifying module 2 configured to humidify gas and a first cap 3 coupled to one end of the humidifying module 2. The humidifying module 2 includes a cartridge 21, to which a plurality of hollow fiber membranes 211 is coupled, a mid-case 22, to which the cartridge 21 is coupled, and a first packing member 23 disposed between the cartridge 21 and the mid-case 22 to hermetically seal between the cartridge 21 and the mid-case 22. The first packing member 23 may hermetically seal between the cartridge 21 and the mid-case 22 through coupling without a casting process. Consequently, the first packing member 23 may hermetically seal an inner space of the first cap 3 and an inner space of the mid-case 22. In the humidifier 1 for fuel cells according to the present disclosure, therefore, the casting process, which requires a relatively long process time, may be omitted, whereby it is possible to improve productivity through reduction in process time for production.

Hereinafter, the humidifying module 2 and the first cap 3 will be described in detail with reference to the accompanying drawings.

Referring to FIGS. 2 to 4, the humidifying module 2 humidifies dry gas supplied from the outside using wet gas discharged from the fuel cell stack. The first cap 3 may be coupled to one end of the humidifying module 2. A second cap 4 may be coupled to the other end of the humidifying module 2. The first cap 3 may transmit dry gas supplied from the outside to the humidifying module 2. The second cap 4 may transmit the dry gas humidified by the humidifying module 2 to the fuel cell stack. The second cap 4 may transmit dry gas supplied from the outside to the humidifying module 2, and the first cap 3 may transmit the dry gas humidified by the humidifying module 2 to the fuel cell stack.

The humidifying module 2 includes the cartridge 21, the mid-case 22, and the first packing member 23.

The cartridge 21 includes the plurality of hollow fiber membranes 211. The hollow fiber membranes 211 may be implemented as the cartridge 21 so as to be modularized. Consequently, the hollow fiber membranes 211 may be installed in the mid-case 22 through a process of coupling the cartridge 21 to the mid-case 22. In the humidifier 1 for fuel cells according to the present disclosure, therefore, ease in installation, separation, and replacement of the hollow fiber membranes 211 may be improved. The cartridge 21 may include an inner case 210 configured to receive the hollow fiber membranes 211. The hollow fiber membranes 211 may be disposed in the inner case 210 so as to be modularized. Each of the hollow fiber membranes 211 may include a polymer membrane made of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

The cartridge 21 may include a first potting portion 212. The first potting portion 212 fixes the hollow fiber membranes 211. The first potting portion 212 may fix one side of each of the hollow fiber membranes 211. In this case, the first potting portion 212 may be formed so as not to block hollow portions of the hollow fiber membranes 211. The first potting portion 212 may be formed by hardening a liquid resin, such as liquid polyurethane resin, using a casting process. The first potting portion 212 may fix the inner case 210 and one side of each of the hollow fiber membranes 211 to each other.

The cartridge 21 may include a second potting portion 213. The second potting portion 213 fixes the other side of each of the hollow fiber membranes 211. In this case, the second potting portion 213 may be formed so as not to block the hollow portions of the hollow fiber membranes 211. Consequently, gas to be supplied to the fuel cell stack may be supplied to the hollow portions of the hollow fiber membranes 211, may be humidified, and may be supplied to the fuel cell stack without being disturbed by the second potting portion 213 and the first potting portion 212. The second potting portion 213 may be formed by hardening a liquid resin, such as liquid polyurethane resin, using a casting process. The second potting portion 213 may fix the inner case 210 and the other side of each of the hollow fiber membranes 211 to each other.

The cartridge 21 is coupled to the mid-case 22. The cartridge 21 may be disposed in the mid-case 22 such that a space is defined between the inner surface of the mid-case 22 and the outer surface of the cartridge 21. The mid-case 22 may include an inlet 221 and an outlet 222. Wet gas containing moisture may be supplied into the mid-case 22 through the inlet 221, and may then come into contact with the outer surfaces of the hollow fiber membranes 211. During this process, the moisture contained in the wet gas may be transmitted through the hollow fiber membranes 211, whereby the gas flowing along the hollow portions of the hollow fiber membranes 211 may be humidified. The humidified gas may be discharged from the hollow fiber membranes 211, and may then be supplied to the fuel cell stack. After humidifying the gas, the wet gas may be discharged from the mid-case 22 through the outlet 222. The inlet 221 may be connected to the fuel cell stack. In this case, the wet gas may be off-gas discharged from the fuel cell stack.

Meanwhile, the cartridge 21 may be provided with an introduction hole (not shown) configured to allow the wet gas to be introduced therethrough and a discharge hole (not shown) configured to allow the wet gas, after humidifying the gas flowing along the hollow portions of the hollow fiber membranes 211, to be discharged therethrough. In this case, the wet gas may be supplied between the inner surface of the mid-case 22 and the outer surface of the cartridge 21 through the inlet 221, may be supplied into the cartridge 21 through the introduction hole, may humidify the gas flowing along the hollow portions of the hollow fiber membranes 211, may be discharged between the inner surface of the mid-case 22 and the outer surface of the cartridge 21 through the discharge hole, and may be discharged from the mid-case 22 through the outlet 222.

Referring to FIGS. 2 to 7, the first packing member 23 hermetically seals between the cartridge 21 and the mid-case 22. The first packing member 23 may be airtightly coupled to at least one end of the humidifying module 2 through mechanical assembly. Consequently, the first packing member 23 allows the first cap 3 to fluidly communicate with only the hollow fiber membranes 112. Consequently, the first packing member 23 may prevent direct mixing between gas to be supplied to the fuel cell stack and wet gas supplied into the mid-case 22. The first packing member 23 may be inserted between the cartridge 21 and the mid-case 22. In this case, the cartridge 21 may be inserted into a first passing hole 23a formed in the first packing member 23. The first packing member 23 may contact each of an inner wall of the mid-case 22, an outer wall of the cartridge 21, and the first potting portion 212. Through such contact, the first packing member 23 may be airtightly coupled to one end of the humidifying module 2. In this case, the first packing member 23 may contact each of a portion of the inner wall of the mid-case 22, a portion of the outer wall of the cartridge 21, and a portion of the first potting portion 212.

The humidifier 1 for fuel cells according to the present disclosure may include a plurality of first packing members 23. The first packing members 23 and 23' may be airtightly coupled to opposite ends of the humidifying module 2, respectively. In this case, the first packing members 23 and 23' may be disposed at opposite sides of the cartridge 21. The first packing member 23' may contact each of the inner wall of the mid-case 22, the outer wall of the cartridge 21, and the second potting portion 213, whereby the first packing member 23' may be airtightly coupled to the other end of the humidifying module 2. In this case, the first packing member 23' may contact each of a portion of the inner wall of the mid-case 22, a portion of the outer wall of the cartridge 21, and a portion of the second potting portion 213. Since the first packing members 23 and 23' are implemented so as to have the same structure except that the positions thereof are different from each other, a description will be given based on the first packing member 23 disposed at one end of the humidifying module 2. It is obvious to those skilled in the art to which the present disclosure pertains that the first packing member 23' disposed at the other end of the humidifying module 2 is derived therefrom.

The first packing member 23 may include a first soft member 231 and a first hard member 232.

The first soft member 231 contacts each of the cartridge 21 and the mid-case 22. The first soft member 231 may be made of an elastically deformable material. For example, the first soft member 231 may be made of rubber. The first soft member 231 may be formed in a ring shape so as to hermetically seal between the cartridge 21 and the mid-case 22.

The first soft member 231 may include a first insertion groove 231a (shown in FIG. 6). The first hard member 232 may be inserted into the first insertion groove 231a. The first insertion groove 231a may be formed in the surface of the first soft member 231 that faces the first cap 3. The first insertion groove 231a may be formed in a ring shape.

The first hard member 232 is coupled to the first soft member 231. The first hard member 232 may be inserted into the first insertion groove 231a. In the state in which the first hard member 232 is inserted into the first insertion groove 231a, the first hard member 232 may be deformed so as to extend in a separation direction in which the cartridge 21 and the mid-case 22 are separated from each other (X-axis direction), as shown in FIG. 7, whereby the first soft member 231 may be brought into tight contact with the cartridge 21. Consequently, the first hard member 232 may increase the force of hermetic sealing between the first soft member 231 and the cartridge 21. In this case, the portion of the first soft member 231 located between the first hard member 232 and the cartridge 21 may be elastically deformed and compressed by the first hard member 232. When the first hard member 232 is extended in the separation direction (X-axis direction), the portion of the first soft member 231 located between the first hard member 232 and the cartridge 21 may also be elastically deformed and compressed, whereby the portion of the first soft member 231 may be brought into tight contact with the mid-case 22. The first hard member 232 may be formed in a ring shape corresponding to the first insertion groove 231a.

The first hard member 232 may be plastically deformed so as to extend in the separation direction (X-axis direction). Consequently, the first hard member 232 may be maintained in the state in which the first soft member 231 is in tight contact with the cartridge 21. In addition, the first hard member 232 may be maintained in the state in which the first soft member 231 is in tight contact with the mid-case 22. Consequently, the first packing member 23 may be firmly maintained in a state of hermetically sealing between the cartridge 21 and the mid-case 22. The first hard member 232 may be made of a plastically deformable material. For example, the first hard member 232 may be made of metal or plastic.

The first hard member 232 may include a first outer wall member 2321, a first connection member 2322, and a first pressing member 2323.

The first outer wall member 2321 is disposed so as to face the mid-case 22. When the first hard member 232 is extended in the separation direction (X-axis direction), the first outer wall member 2321 may be deformed toward the mid-case 22. Consequently, the first outer wall member 2321 may bring the portion of the first soft member 231 located between the first hard member 232 and the mid-case 22 into tight contact with the mid-case 22.

The first connection member 2322 connects the first outer wall member 2321 and the first pressing member 2323 to each other. The first connection member 2322, the first outer wall member 2321, and the first pressing member 2323 may be integrally formed.

The first pressing member 2323 is disposed so as to face the cartridge 21. When the first hard member 232 is extended in the separation direction (X-axis direction), the first pressing member 2323 may be deformed toward the cartridge 21. Consequently, the first pressing member 2323 may press the portion of the first soft member 231 located between the first hard member 232 and the cartridge 21 so as to come into tight contact with the cartridge 21.

A first extension groove 232a may be disposed between the first pressing member 2323 and the first outer wall member 2321. In the state in which the first soft member 231 is inserted between the mid-case 22 and the cartridge 21 and the first hard member 232 is inserted into the first insertion groove 231a, an extension tool (not shown) may be inserted into the first extension groove 232a. As the extension tool is inserted into the first extension groove 232a, the first pressing member 2323 may be deformed toward the cartridge 21 to press the first soft member 231 toward the cartridge 21. In the humidifier 1 for fuel cells according to the present disclosure, therefore, the first packing member 23 may be installed in the state in which the first hard member 232 is not extended, whereby it is possible to improve ease in installing the first packing member 23. Also, in the humidifier 1 for fuel cells according to the present disclosure, the first hard member 232 may be easily extended using the extension tool after the first packing member 23 is installed such that the first soft member 231 is brought into tight contact with the cartridge 21, whereby it is possible to improve ease in increasing hermetic sealing force. The extension tool may be a tool configured to be inserted into the first extension groove 232a in order to extend the first hard member 232 in the separation direction (X-axis direction). The portion of the extension tool that is inserted into the first extension groove 232a may be formed so as to be gradually decreased in size in a direction in which the extension tool is inserted into the first extension groove 232a. While being inserted into the first extension groove 232a, the extension tool may deform the first outer wall member 2321 toward the mid-case 22.

The first pressing member 2323 may be formed so as to have a larger thickness than the first outer wall member 2321. Consequently, the first pressing member 2323 may be plastically deformed toward the cartridge 21, whereby the first pressing member may be more firmly maintained in the state in which the first soft member 231 is brought into tight contact with the cartridge 21. Consequently, the humidifier 1 for fuel cells according to the present disclosure is implemented to further increase the force of hermetic sealing between the first packing member 23 and the cartridge 21.

Here, there is a possibility of the first packing member 23 being too deeply inserted between the mid-case 22 and the cartridge 21 during insertion of the extension tool into the first extension groove 232a in order to deform the first hard member 232. In order to prevent this, the first soft member 231 may be coupled to the mid-case 22 by catching. The structure of the first soft member 231 will be described below in detail.

The first soft member 231 may include a first soft body 2311, an extension member 2312, a catching groove 2313, and a catching member 2314.

The first soft body 2311 is disposed between the cartridge 21 and the mid-case 22. The first insertion groove 231a may be formed in the first soft body 2311. When the first hard member 232 is extended in the separation direction (X-axis direction), the first pressing member 2323 may press the portion of the first soft body 2311 located between the first hard member 232 and the cartridge 21. The first outer wall member 2321 may press the portion of the first soft body 2311 located between the first hard member 232 and the mid-case 22.

The extension member 2312 extends from the first soft body 2311 toward the mid-case 22. The extension member 2312 may be supported by the mid-case 22. The extension member 2312 may connect the catching member 2314 and the first soft body 2311 to each other. The extension member 2312, the catching member 2314, and the first soft body 2311 may be integrally formed.

The catching groove 2313 is formed in the extension member 2312. The catching groove 2313 may be disposed between the first soft body 2311 and the catching member 2314. The mid-case 22 may be inserted into the catching groove 2313.

The catching member 2314 is coupled to the extension member 2312. The catching member 2314 may be disposed outside of the mid-case 22 inserted into the catching groove 2313. In this case, the mid-case 22 may be disposed between the catching member 2314 and the first soft body 2311.

Since the first soft member 231 is coupled to the mid-case 22 by catching, as described above, the depth by which the first packing member 23 is inserted between the mid-case 22 and the cartridge 21 may be limited during deformation of the first hard member 232. In the humidifier 1 for fuel cells according to the present disclosure, therefore, it is possible to improve stability in the first soft member 231 being brought into tight contact with the cartridge 21 through deformation of the first hard member 232.

Referring to FIG. 8, the first soft member 231 may include a first supporting member 2315. The first supporting member 2315 protrudes toward the first potting portion 212 of the cartridge 21. The first supporting member 2315 may be supported by the first potting portion 212. During deformation of the first hard member 232, therefore, the first supporting member 2315 may be supported by the first potting portion 212, whereby it is possible to limit the depth by which the first packing member 23 is inserted between the mid-case 22 and the cartridge 21.

The first supporting member 2315 may protrude from the first soft body 2311. The first supporting member 2315 may protrude by a length that does not block the hollow portions of the hollow fiber membranes 211 coupled to the first potting portion 212. The first supporting member 2315 and the first soft body 2311 may be integrally formed.

Referring to FIG. 8, the first soft member 231 may include a first reinforcement member 2316. The first reinforcement member 2316 may be disposed in the first soft body 2311. The first reinforcement member 2316 may be made of a material that has higher rigidity than the first soft body 2311. For example, the first reinforcement member 2316 may be made of metal or plastic. The first reinforcement member 2316 may be implemented so as to be disposed in the first soft body 2311 by insert molding.

Referring to FIGS. 2 to 8, the first cap 3 is coupled to one end of the humidifying module 2. The space between the first cap 3 and the cartridge 21 may be isolated from the space between the cartridge 21 and the mid-case 22 in a hermetically sealed state by the first packing member 23.

The first cap 3 may include a first pushing member 31. When the first cap 3 is coupled to one end of the humidifying module 2, the first pushing member 31 may push the extension member 2312 toward the mid-case. Consequently, the first pushing member 31 may further increase fixing force necessary for the first packing member 23 to be maintained in a state of hermetically sealing between the cartridge 21 and the mid-case 22.

Referring to FIGS. 2 to 4, the second cap 4 is coupled to the other end of the humidifying module 2. The space between the second cap 4 and the cartridge 21 may be isolated from the space between the cartridge 21 and the mid-case 22 in a hermetically sealed state by the first packing member 23'. The first packing member 23' is approximately identical to the first packing member 23 described above, and a detailed description thereof will be omitted.

Referring to FIGS. 9 to 13, the humidifier 1 for fuel cells according to the present disclosure may be implemented such that a plurality of cartridges 21 is coupled in the mid-case 22. In this case, the mid-case 22 may include a partition member (not shown) disposed between the cartridges 21 and 21'. The cartridges 21 and 21' may be individually detachably coupled to the mid-case 22 in a state of being disposed between the partition members. Meanwhile, in FIGS. 11 to 13, each of the cartridges 21 and 21' is shown with omission of a plurality of hollow fiber membranes, although each of the cartridges includes the hollow fiber membranes.

When the humidifying module 2 is implemented such that the plurality of cartridges 21 is coupled to the mid-case 22, the humidifying module may include a second packing member 24.

The second packing member 24 is disposed between the cartridges 21 and 21' to hermetically seal between the cartridges 21 and 21'. The second packing member 24 may prevent direct mixing between gas to be supplied to the fuel cell stack and wet gas supplied between the cartridges 21 and 21'. The humidifier 1 for fuel cells according to the present disclosure may include a plurality of second packing members 24. The second packing members 24 and 24' may be disposed at opposite sides of the cartridges 21 and 21'. Since the second packing members 24 and 24' are implemented so as to have the same structure except that the positions thereof are different from each other, a description will be given based on the second packing member 24 disposed at one side of each of the cartridges 21 and 21'. It is obvious to those skilled in the art to which the present disclosure pertains that the second packing member 24' disposed at the other side of each of the cartridges 21 and 21' is derived therefrom.

The second packing member 24 may include a second soft member 241 and a second hard member 242.

The second soft member 241 contacts each of the cartridges 21 and 21'. The second soft member 241 may be made of an elastically deformable material. For example, the second soft member 241 may be made of rubber. The second soft member 241 may include a second insertion groove 241a (shown in FIG. 10). The second hard member 242 may be inserted into the second insertion groove 241a. The second insertion groove 241a may be formed in the surface of the second soft member 241 that faces the first cap 3.

The second hard member 242 is coupled to the second soft member 241. The second hard member 242 may be inserted into the second insertion groove 241a. In the state in which the second hard member 242 is inserted into the second insertion groove 241a, the second hard member 242 may be deformed so as to extend in a separation direction in which the cartridges 21 and 21' are separated from each other (X-axis direction), as shown in FIG. 12, whereby the second soft member 241 may be brought into tight contact with the cartridges 21 and 21'. Consequently, the second hard member 242 may increase the force of hermetic sealing between the second soft member 241 and the cartridges 21 and 21'. In this case, the portion of the second soft member 241 located between the second hard member 242 and the cartridge 21 may be elastically deformed and compressed by the second hard member 242. The portion of the second soft member 241 located between the second hard member 242 and the cartridge 21' may be elastically deformed and compressed by the second hard member 242.

The second hard member 242 may be plastically deformed so as to extend in the separation direction (X-axis direction). Consequently, the second hard member 242 may be maintained in the state in which the second soft member 241 is in tight contact with the cartridges 21 and 21'. Consequently, the second packing member 24 may be firmly maintained in a state of hermetically sealing between the cartridges 21 and 21'. The second hard member 242 may be made of a plastically deformable material. For example, the second hard member 242 may be made of metal or plastic.

The second hard member 242 may include a second connection member 2421 and a plurality of second pressing members 2422 and 2422'.

The second connection member 2421 connects the second pressing members 2422 and 2422' to each other. The second connection member 2421 and the second pressing members 2422 and 2422' may be integrally formed.

The second pressing members 2422 and 2422' are disposed so as to face the cartridges 21 and 21'. When the second hard member 242 is extended in the separation direction (X-axis direction), the second pressing members 2422 and 2422' may be deformed toward the cartridges 21 and 21'. Consequently, the second pressing members 2422 and 2422' may press the portion of the second soft member 241 located between the cartridges 21 and 21' so as to come into tight contact with the cartridges 21 and 21'.

A second extension groove 242a may be disposed between the second pressing members 2422 and 2422'. In the state in which the second soft member 241 is inserted between the cartridges 21 and 21' and the second hard member 242 is inserted into the second insertion groove 241a, the extension tool may be inserted into the second extension groove 242a. As the extension tool is inserted into the second extension groove 242a, the second pressing members 2422 and 2422' may be deformed toward the cartridges 21 and 21' to press the second soft member 241 toward the cartridges 21 and 21'. In the humidifier 1 for fuel cells according to the present disclosure, therefore, the second packing member 24 may be installed in the state in which the second hard member 242 is not extended, whereby it is possible to improve ease in installing the second packing member 24. Also, in the humidifier 1 for fuel cells according to the present disclosure, the second hard member 242 may be easily extended using the extension tool after the second packing member 24 is installed such that the second soft member 241 is brought into tight contact with the cartridges 21 and 21', whereby it is possible to improve ease in increasing hermetic sealing force.

The second hard member 242 may be formed so as to have a larger thickness than the first hard member 232. The average thickness of the entirety of the second hard member 242 may be greater than the average thickness of the entirety of the first hard member 232. In this case, each of the second pressing members 2422 and 2422' may be formed so as to have a larger thickness than the first outer wall member 2321. Each of the second pressing members 2422 and 2422' may be formed so as to have the same thickness as the first pressing member 2323. Consequently, the humidifier 1 for fuel cells according to the present disclosure is implemented to further increase the force of hermetic sealing between the second packing member 24 and the cartridges 21 and 21'.

Here, the second soft member 241 and the first soft member 231 may be integrally formed. Consequently, it is possible to install the second soft member 241 and the first soft member 231 through a single insertion operation. In this case, the second hard member 242 and the first hard member 232 may be individually manufactured.

Referring to FIG. 13, there is a possibility of the second packing member 24 being too deeply inserted between the cartridges 21 and 21' during insertion of the extension tool into the second extension groove 242a in order to deform the second hard member 242. In order to prevent this, the second soft member 241 may include a plurality of second supporting members 2412 and 2412' protruding from a second soft body 2411.

The second soft body 2411 is disposed between the cartridges 21 and 21'. The second insertion groove 241a may be formed in the second soft body 2411.

The second supporting members 2412 and 2412' protrude toward first potting portions 212 and 212' of the cartridges 21 and 21'. The second supporting members 2412 and 2412' may be supported by the first potting portions 212 and 212'. During deformation of the second hard member 242, therefore, the second supporting members 2412 and 2412' may be supported by the first potting portions 212 and 212', whereby it is possible to limit the depth by which the second packing member 24 is inserted between the cartridges 21 and 21'.

The second supporting members 2412 and 2412' may protrude from opposite sides of the second soft body 2411. The second supporting members 2412 and 2412' may protrude by a length that does not block the hollow portions of the hollow fiber membranes 211 (shown in FIG. 8) coupled to the first potting portions 212 and 212'. The second supporting members 2412 and 2412' and the second soft body 2411 may be integrally formed.

Referring to FIG. 13, the second soft member 241 may include a second reinforcement member 2413. The second reinforcement member 2413 may be disposed in the second soft body 2411. The second reinforcement member 2413 may be made of a material that has higher rigidity than the second soft body 2411. For example, the second reinforcement member 2413 may be made of metal or plastic. The second reinforcement member 2413 may be disposed in the second soft body 2411 by insert molding.

FIGS. 8 to 13 show that two cartridges 21 are coupled to the mid-case 22. However, the present disclosure is not limited thereto. As shown in FIG. 14, the humidifier 1 for fuel cells according to the present disclosure may be implemented such that three cartridges 21, 21', and 21" are coupled to the mid-case 22. In this case, two second packing members 24 may be provided at one side of the humidifying module 2, and two second packing members 24' may be provided at the other side of the humidifying module 2. Although not shown, the humidifier 1 for fuel cells according to the present disclosure may be implemented such that four or more cartridges 21 are coupled to the mid-case 22. In this case, the number of second packing members 24 may be increased in proportion to the number of cartridges 21 coupled to the mid-case 22.

The present disclosure described above is not limited to the above embodiments and the accompanying drawings, and it will be obvious to a person having ordinary skill in the art to which the present disclosure pertains that various substitutions, modifications, and alterations are possible without departing from the technical idea of the present disclosure.

The invention claimed is:

1. A humidifier for fuel cells, the humidifier comprising:
a humidifying module configured to humidify dry gas supplied from outside using wet gas discharged from a fuel cell stack; and
a first cap coupled to one end of the humidifying module, wherein
the humidifying module comprises: a mid-case; and at least one cartridge disposed in the mid-case, the cartridge being configured to receive a plurality of hollow fiber membranes,
the humidifier further comprises a first packing member airtightly coupled to at least one end of the humidifying module through mechanical assembly such that the first cap fluidly communicates with only the hollow fiber membranes,
the first packing member comprises: a first soft member configured to contact each of the cartridge and the mid-case; and a first hard member coupled to the first soft member,
the first soft member comprises a first insertion groove configured to allow the first hard member to be inserted thereinto, and
the first hard member is deformed so as to extend in a separation direction in which the cartridge and the mid-case are separated from each other in a state of being inserted into the first insertion groove, whereby the first soft member is brought into tight contact with the cartridge.

2. The humidifier according to claim 1, wherein the first hard member is plastically deformed so as to extend in the separation direction, whereby the first hard member is maintained in a state in which the first soft member is in tight contact with the cartridge.

3. The humidifier according to claim 1, wherein the first hard member comprises:
a first pressing member disposed so as to face the cartridge;
a first outer wall member disposed so as to face the mid-case;
a first connection member configured to connect the first pressing member and the first outer wall member to each other; and
a first extension groove disposed between the first pressing member and the first outer wall member.

4. The humidifier according to claim 3, wherein, as an extension tool is inserted into the first extension groove, the first pressing member is deformed toward the cartridge to press the first soft member toward the cartridge.

5. The humidifier according to claim 3, wherein the first pressing member is formed so as to have a larger thickness than the first outer wall member.

6. The humidifier according to claim 3, wherein
the cartridge comprises a first potting portion configured to fix one side of each of the hollow fiber membranes, and
the first soft member comprises a first supporting member protruding toward the first potting portion, the first supporting member being supported by the first potting portion.

7. The humidifier according to claim 1, wherein the first soft member comprises:
a first soft body disposed between the mid-case and the cartridge;
an extension member extending from the first soft body toward the mid-case;
a catching groove formed in the extension member; and
a catching member disposed outside of the mid-case inserted into the catching groove.

8. The humidifier according to claim 7, wherein the first cap comprises a first pushing member configured to push the extension member toward the mid-case.

9. The humidifier according to claim 3, wherein
the cartridge, in plural, is coupled to the mid-case,
the humidifying module comprises a second packing member disposed between the cartridges, the second packing member being configured to hermetically seal between the cartridges,
the second packing member comprises: a second soft member configured to contact each of the cartridges; and a second hard member coupled to the second soft member,
the second soft member comprises a second insertion groove configured to allow the second hard member to be inserted thereinto, and
the second hard member is deformed so as to extend in a separation direction in which the cartridges are separated from each other in a state of being inserted into the second insertion groove, whereby the second soft member is brought into tight contact with the cartridges.

10. The humidifier according to claim 9, wherein the second soft member and the first soft member are integrally formed.

11. The humidifier according to claim 9, wherein the second hard member is formed so as to have a larger thickness than the first hard member.

12. The humidifier according to claim 1, wherein
the cartridge comprises a first potting portion configured to fix the hollow fiber membranes, and
the first packing member contacts each of an inner wall of the mid-case, an outer wall of the cartridge, and the first potting portion.

* * * * *